United States Patent [19]
Seah, deceased et al.

[11] Patent Number: 5,411,681
[45] Date of Patent: May 2, 1995

[54] RANDOM PACKING

[75] Inventors: Alexander M. Seah, deceased, late of Houston, Tex.; Beverly Derrick, heir, Chicago, Ill.; Zohtan Seah, heir, Chicago, Ill.; Jamel Seah, heir, Chicago, Ill.

[73] Assignee: Jaeger Products, Inc., Houston, Tex.

[21] Appl. No.: 291,723

[22] Filed: Aug. 16, 1994

Related U.S. Application Data

[63] Continuation of Ser. No. 49,573, Apr. 19, 1993, abandoned.

[51] Int. Cl.$^6$ ............................................. B01F 3/04
[52] U.S. Cl. ................................ 261/94; 261/DIG. 72
[58] Field of Search .......................... 261/94, DIG. 72

[56] References Cited

U.S. PATENT DOCUMENTS

| | | | |
|---|---|---|---|
| 3,266,787 | 8/1966 | Eckert | 261/DIG. 72 |
| 3,311,356 | 3/1967 | Eckert | 261/DIG. 72 |
| 4,041,113 | 8/1977 | McKeown . | |
| 4,203,935 | 5/1980 | Hackenjos . | |
| 4,277,425 | 7/1981 | Leva | 261/DIG. 72 |
| 4,303,599 | 12/1981 | Strigle et al. . | |
| 4,327,043 | 4/1982 | Leva | 261/DIG. 72 |
| 4,333,892 | 6/1982 | Ellis et al. | 261/DIG. 72 |
| 4,425,285 | 1/1984 | Shimoi et al. | 261/DIG. 72 |
| 4,511,519 | 4/1985 | Hsia . | |
| 4,575,435 | 3/1986 | Kuhl | 261/DIG. 72 |
| 4,581,299 | 4/1986 | Jager . | |
| 4,668,442 | 5/1987 | Lang . | |
| 4,670,196 | 6/1987 | Hsia . | |

FOREIGN PATENT DOCUMENTS

| | | |
|---|---|---|
| 1129931 | 5/1962 | Germany . |
| 2313287 | 9/1974 | Germany . |
| 2845804 | 5/1979 | Germany .................... 261/DIG. 72 |
| 1541432 | 2/1979 | United Kingdom . |
| 1541433 | 2/1979 | United Kingdom . |
| 1602183 | 11/1981 | United Kingdom ....... 261/DIG. 72 |
| 0925374 | 5/1982 | U.S.S.R. .................... 261/DIG. 72 |
| 0990277 | 1/1983 | U.S.S.R. .................... 261/DIG. 72 |

OTHER PUBLICATIONS

"Physical Properties Of Metal Packings" promotional of Jaeger Tri-Packs, Inc., 1 page.
"Tower Packings, Internals And Column Designs-All From One Company" promotional of Jaeger Tri--Packs, Inc., 4 pages.
"Jaeger Column Packing And Internals Give High Performance" advertisement of Jaeger Products, Inc., 1 page.
"Tri-Packs ® High Performance Column Packing" promotional of Jaeger Tri-Packs, Inc., 6 pages.
"Koch-Everything You Need In Tower Packing And Internals" promotional of Koch Engineering Company, Inc., 6 pages.
"Tower Packings And Internals" Bulletin Number 217-Third Edition, of Glitsch, Inc., 3 pages.
Advertisement for Snowflake TM packing by Norton Chemical Process Products, p. 42 of Mar. 1988 edition of Ground Water Age.

*Primary Examiner*—Tim Miles
*Attorney, Agent, or Firm*—E. Richard Zamecki

[57] ABSTRACT

Disclosed is a random packing element for use in exchange process apparatus, for example. The packing element features boughed strips and projections to provide an abundant supply of liquid flow surfaces, drip points and gas flow-through passages to enhance the interfacing of fluids in the exchange process packing bed.

16 Claims, 1 Drawing Sheet

RANDOM PACKING

This is a continuation of application Ser. No. 08/049,573, filed on Apr. 19, 1993, now abandoned.

BACKGROUND OF THE INVENTION

1. Field of the Invention

The present invention pertains to techniques for enhancing exchange processes between two fluids. More particularly, the present invention relates to packing elements for use in exchange process chambers, such as are utilized in mass transfer or heat exchange processes, for example.

2. Description of Prior Art

Many commercial and chemical processes involve mass transfer (exchange) or heat exchange, and utilize packed columns or chambers to carry out the steps. Such processes can include distillation, absorption and desorption, gas cleaning and drying, scrubbing and various biological processes, such as filtrations. Two fluids, usually a gas and a liquid, although two liquids may be utilized, are intermingled within a chamber, typically as counter-current flow streams wherein the two fluids move generally in opposite senses along the same flow axis. In a co-current system, the two fluids move generally in the same sense along a single flow axis; a cross-current facility features the two fluids moving along separate, intersecting flow axes.

The mass transfer rates and/or the reaction rates of the processes increase with increasing amounts of effective surface area that can be wetted by liquid within the chamber and over which the two fluids can then interface with each other. Packing elements are placed in the chamber to increase the amount of surface area available for such interfacing. Packing systems are generally of two types, depending on the packing elements and their arrangements in the transfer chamber. Structured packing systems generally include extended, structured packing elements that are arranged within the chamber. Random packing systems comprise generally small, individual packing elements which may be dumped into the exchange chamber in a random array.

Packing is generally included in exchange process columns to enhance the interaction between two fluids in the column, thereby increasing the efficiency of the process. Where at least one of the fluids is a liquid, the interaction between the fluids may be so enhanced by providing sufficient surface area to be wetted by the liquid, and providing drip points from which the liquid may pass from one surface to another while being further exposed to gas as the other liquid flowing between the surfaces. If the surfaces provided by the packing are too tightly-arranged, the gas may experience sufficient flow resistance to hamper movement of the gas through the packing, thereby diminishing the opportunity for exposure of the liquid to the gas. Poorly-designed random packing elements may feature significant mutually-complementary structures so that one such element may fit relatively tightly against another, or even extend within the lateral extent of the second element. Such nesting of random packing elements may produce a relatively tightly-packed array of surfaces, producing significant gas flow resistance. Further, where the liquid flow surfaces are too tightly packed, liquid may bridge from one surface to another without dripping. Not only does such bridging diminish the interaction cross section with the gas, but it may also further impede the flow of gas through the packing.

The present invention provides random packing elements which avoid the aforementioned disadvantages of poorly-designed packing elements.

SUMMARY OF THE INVENTION

It is an object of the present invention to provide a random packing element that will enhance the possibility of interaction between two fluids in an exchange process chamber, for example. The exchange process interaction may be so enhanced by a packing element of the present invention providing an arrangement of flow surfaces that are wettable by at least one of the fluids as a liquid, for example, with the surfaces appropriately separated to reduce flow resistance therethrough by another fluid as a gas. It is a further object of the present invention to provide an abundance of drip points from the flow surfaces, with the drip points sufficiently separated to minimize bridging of liquid from a drip point to another flow surface. It is a still further object of the present invention to minimize nesting of multiple such packing elements in a packed bed in an exchange process chamber.

The present invention provides a random packing element for use in exchange process apparatus involving at least two fluids, with the packing element made from a generally planar sheet of material that is separated into a plurality of strips and projections, with the strips generally bowed to opposite sides of the material such that the packing element has no rotational axis of symmetry perpendicular to the original plane of the material. The packing element may provide attachment areas at both opposite ends of the material to which strips and projections are attached. Attachment areas may be provided intermediate the ends of the material, with strips attached to such intermediate attachment areas; projections may also be attached at such intermediate attachment areas. The projections, or fingers, provide drip points. Additionally, edges of the projections and/or the strips may be serrated to provide drip points. The serrated edges serve also to avoid nesting of multiple such packing elements. Two strips extending between the same two attachment areas may cooperate to form a closed loop. The projections in particular may be of different lengths. The strips in general may each have different shapes and/or different positions relative to the original plane of the sheet of material. The strips and projections, for example, may be thus extended toward opposite sides of the material to ensure the lack of rotational symmetry of the packing element about an axis perpendicular to the original plane of the sheet. Additionally, the pattern of extensions of the strips 1 and possibly the projections as well, may be such that the lateral extent of the packing element perpendicular to the original plane of the sheet of material may provide a net skewed effect, or incline, so that the packing elements may settle predominantly in inclined positions in a packed bed in an exchange process chamber, for example.

The packing element may be made of metal or any other appropriate material, such as plastic, which may be utilized in a particular exchange process application, for example. A metal sheet, for example, may be slit and then deformed from its original planar form to bow the resulting strips and extend the resulting projections, for example. The original slitting of the material may be made with saw-tooth patterned cuts to provide serrated edges along the strips and projections, for example. Alternatively, serrations may be formed as a separate step, for example, such as during the extending of the bows and strips.

The present invention provides a random packing element which includes liquid flow surfaces appropriately separated to provide minimal gas flow resistance through the random packing element. Drip points are also provided to further enhance the interaction possibilities between the fluids in the exchange process application. A random packing element according the present invention also minimizes nesting among such packing elements to further ensure minimal flow resistance to gas through a bed made of packing elements according to the present invention, and to ensure an abundance of drip points from appropriately separated flow surfaces.

DESCRIPTION OF PREFERRED EMBODIMENTS

Figure 1:
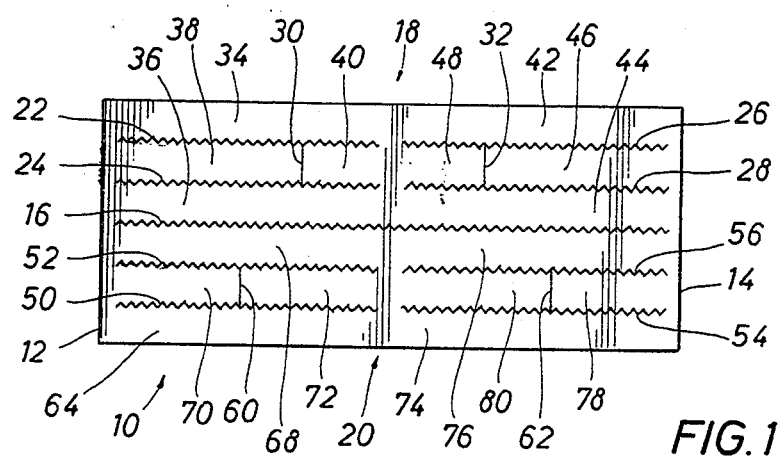
FIG. 1 is a top plan view of a planar sheet of material, slit to define a plurality of strips and projections.
Figure 2:
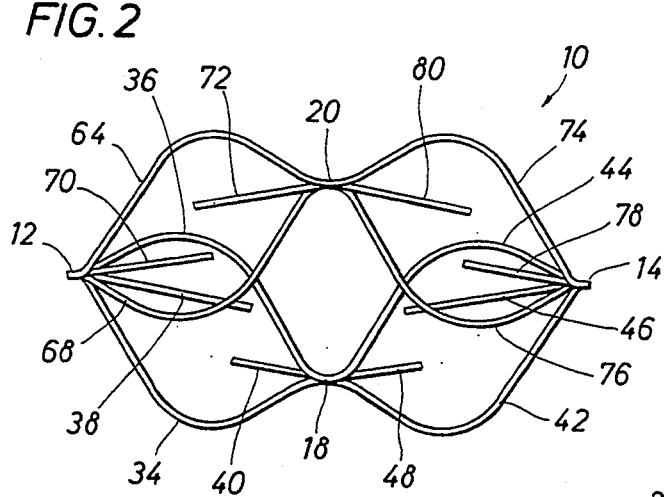
FIG. 2 is a side elevation of a random packing element according to the present invention, formed from the slit sheet of material of FIG. 1.
Figure 3:
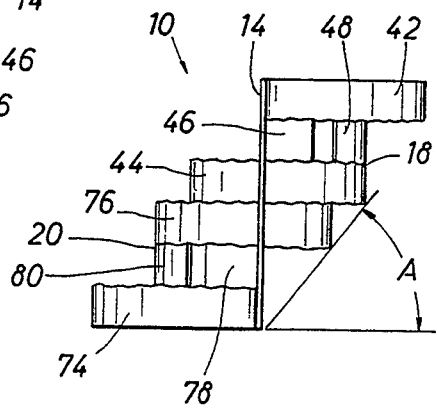
FIG. 3 is an end elevation of the packing element as formed in FIG. 2.
Figure 4:
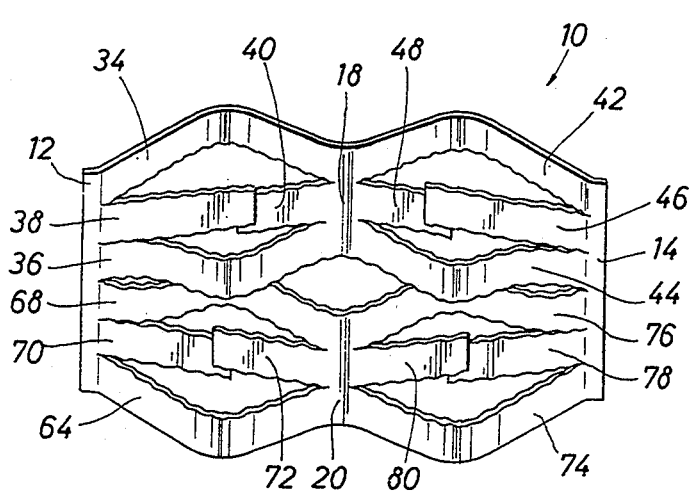
FIG. 4 is a perspective view of the packing element of FIGS. 2 and 3.

A generally-rectangular, planar sheet of material is shown generally at 10 in FIG. 1; the material 10 is shown in FIGS. 2–4 formed into a random packing element according to the present invention. The material 10 may be metal or some other material, such as plastic. In general, the material 10 is provided with slits that define a plurality of strips and a plurality of projections, which are shaped to deform the planar material as illustrated in FIG. 1 into a three-dimensionally-extending figure as illustrated in FIGS. 2–4.

As may be appreciated by reference to FIG. 1, wherein the sheet of material 10 is illustrated in its planar form, the particular embodiment of the packing element illustrated herein is constructed from a sheet of material whose length is on the order of approximately two and one-half times the width of the sheet. The slits are shown extending generally lengthwise relative to the dimensions of the sheet 10 to form the strips and projections. All of the lengthwise slits provided in the material 10 are saw-toothed to provide serrated edges. A strip is a generally elongate portion of the sheet of material which is attached at both ends of the strip; a projection, or finger, is considered to be a generally elongate portion of the sheet of the material attached at only one end of the projection. It will be appreciated, however, that, in any given case, the extent of the projection away from its attached end may be greater than, equal to or smaller than the extent of the projection measured along the attached end of the projection. The region where one or more strips and/or one or more projections may be attached to the sheet of material may be referred to as an attachment area. Consequently, a strip extends between two attachment areas, and a projection extends from one attachment area.

In the particular embodiment of the present invention illustrated herein, none of the slits extends through either end of the material 10. Consequently, a laterally-extending end attachment area 12 is provided at one end of the material, and a laterally-extending end attachment area 14 is provided at the opposite end of the material. If a slit would extend through the end of the material, then the end region of the material would be broken into at least two attachment areas.

A single, saw-tooth slit 16 extends generally along the center line of the material 10, from one end attachment area 12 to the other end attachment area 14. The slit 16 generally divides the material into two portions, as may be appreciated particularly by reference to FIGS. 1, 2 and 4.

At the midpoint of the top half of the sheet of material 10 as viewed in FIG. 1, a laterally-extending, intermediate attachment area shown generally at 18 is unbroken by any slits. Similarly, a laterally-extending, intermediate attachment area shown generally at 20 is provided about the midpoint of the bottom half of the sheet of material 10 as illustrated in FIG. 1.

In the upper half of the material as viewed in FIG. 1, two parallel saw-tooth slits 22 and 24 extend from the end attachment area 12 to the intermediate attachment area 18, and two parallel saw-tooth slits 26 and 28 extend between the intermediate attachment area 18 and the end attachment area 14. A laterally-extending slit 30 extends between the two slits 22 and 24, and a laterally-extending slit 32 extends between the two slits 26 and 28.

The slit 22 cooperates with the outer edge of the sheet of material 10 to define, in part, a strip 34 which extends between the end attachment area 12 and the intermediate attachment area 18. The slit 24 cooperates with a portion of the slit 16 to define, in part, a strip 36 extending between the attachment areas 12 and 18 as well. The two slits 22 and 24 provide a projection 38, which ends at the slit 30 and is attached, between the strips 34 and 36, at the end attachment area 12. Similarly, a projection 40 is formed to extend from the intermediate attachment area 18 to the slit 30, bounded also by the slits 22 and 24. The strips 34 and 36 are mutually parallel in the configuration of FIG. 1.

The slit 26 cooperates with the outer edge of the sheet of material 10 to define, in part, a strip 42 which is generally aligned with the strip 34 in FIG. 1. The slit 28 cooperates with a portion of the slit 16 to define, in part, a strip 44 which is mutually parallel with the strip 42 and generally aligned with the strip 36 in FIG. 1. Both of the strips 42 and 44 extend between the attachment areas 14 and 18. The slits 26 and 28, as well as the slit 32, cooperate to form a projection 46 extending from the end attachment area 14. The slits 26 and 28, as well as the slit 32 also cooperate to form a projection 48 extending from the intermediate attachment area 18. The projections 38, 40, 46 and 48 are generally aligned in FIG. 1.

A similar construction of strips and projections is provided in the lower half of the sheet of material 10 as viewed in FIG. 1, again provided by an array of slits, most of which are illustrated as saw-tooth in profile. Slits 50 and 52 are generally mutually parallel, and aligned generally with slits 54 and 56, respectively. Laterally-extending straight slits 60 and 62 help define projections. Thus, the slit 50 cooperates with the outer edge of the sheet of material 10 to define, in part, a strip 64 extending between the attachment areas 12 and 20. Slit 52 cooperates with a portion of the slit 16 to define a strip 68, also extending between attachment areas 12 and 20 and being mutually parallel with the strip 64.

Between the strips 64 and 68 are projections 70 and 72, defined, in part, by the slits 52, 50 and 60. The projection 70 extends from the end attachment area 12 while the projection 72 extends from the intermediate attachment area 20.

The slit 54 cooperates with the outer edge of the sheet of material 10 to define, in part, a strip 74, while the slit 56 cooperates with a portion of the slit 16 to define a strip 76. The strips 74 and 76 are mutually parallel in FIG. 1, and extend between the attachment areas 14 and 20, with the strip 74 generally aligned with the strip 64 and the strip 76 generally aligned with the strip 68. The slits 54, 56 and 62 also define, in part, projections 78 and 80 positioned between the strips 74 and 76 and extending from the attachment areas 14 and 20, respectively. In FIG. 1, the projections 70, 72, 78 and 80 are generally mutually aligned.

With the various slits provided in the sheet of material 10 as illustrated in FIG. 1, the resulting strips and projections may be bent or otherwise deformed to provide the packing element as illustrated in FIGS. 2-4. For example, if the positions of the end attachment areas 12 and 14 are taken to define the original plane of the sheet of material 10 as viewed in FIG. 1, then the intermediate attachment area 18 is positioned to one side of that plane while the other intermediate attachment area 20 is positioned to the opposite side of that plane. Then, as viewed in FIGS. 2 and 4, the two strips 64 and 74 are bowed upwardly while the two strips 68 and 76 are bowed downwardly. It will be appreciated that strips 64 and 68 both extend between the same two attachment areas 12 and 20, and, as mutually separated in the plane of the paper as illustrated in FIG. 2, form an extended but closed loop. Similarly, a closed but extended loop is formed by separating the strips 74 and 76, which extend between the same two attachment areas 14 and 20.

The two strips 34 and 42 are bowed downwardly, (FIGS. 2 and 4) while the two strips 36 and 44 are bowed upwardly. Thus, an extended but closed loop is provided by the two strips 34 and 36 which extend between the same two attachment areas 12 and 18. Also, an extended but closed loop is provided by the two strips 42 and 44 which extend between the same two attachment areas 14 and 18.

The four closed loops thus formed by the pairs of strips extending between corresponding attachment areas are mutually displaced in the plane of the paper in FIG. 2 as well as laterally displaced as viewed in FIGS. 3 and 4.

As viewed in FIGS. 2 and 4, the projections 40 and 48 are positioned to extend upwardly from the intermediate attachment area 18, while the projections 38 and 46 are positioned to extend downwardly from their respective end attachment areas 12 and 14. Also, projections 72 and 80 are made to extend downwardly from the intermediate attachment area 20 while projections 70 and 78 are positioned to extend upwardly from their respective end attachment areas 12 and 14. It will be appreciated that the angles at which the projections are positioned in FIGS. 2 and 4 may be varied. It will also be noted that the lengths of the projections may vary, and are shown as being different in the drawings. Further, it will be appreciated that the free ends of the projections may be serrated by providing the slits 30, 32, 60 and 62 as saw-toothed, for example.

The size of the packing element may be adjusted according to the application, as may therefore be the dimensions of the projections and strips, for example. It will be appreciated, however, that regardless of the overall dimensions of the packing element according to the present invention, the element provides extensive flow surfaces combined with sufficient openings between the flow surfaces to minimize gas flow resistance through the packing element. The ends of the projections provide drip points, as do the serrations along the edges of the projections and strips. The attachment areas provide additional flow paths, joining adjacent strips and projections, for example. Additionally, the attachment areas add to the structural rigidity of the finished packing element. Generally, each strip may have a different shape and/or different horizontal position, as particularly illustrated in FIG. 2. Further, with the intermediate attachment areas 18 and 20 positioned to opposite sides of the plane defined by the end attachment areas 12 and 14, for example, the end-view profile of the packing element is generally inclined at an angel A as shown in FIG. 3. Consequently, as a packing element is dropped into a process chamber, for example, there is a considerable probability that the packing element will fall to reside in an inclined position, with all of the strip and projection surfaces inclined, relative to the horizontal, for example. Additional packing elements dumped on the first packing element, for example, will take random orientations. However, the serrated edges particularly of the strips will prevent strip-nesting, that is, nesting of adjacent packing elements with strips from two packing elements generally closing off flow paths through the packing elements.

It will be appreciated that the shape of the packing element as illustrated is such that there is no axis of rotational symmetry passing through the original plane of the packing element material 10, defined by the positions of the end attachment areas 12 and 14, for example.

The present invention provides a packing element which, used in a packing bed of like packing elements in an exchange process chamber, for example, provides an abundant supply of liquid flow surfaces, drip points and flow-through passages for gas to enhance the interfacing of two fluids in the exchange process apparatus.

The foregoing disclosure and description of the invention is illustrative and explanatory thereof, and various changes in the size, shape and materials as well as in the details of the illustrated construction may be made within the scope of the appended claims without departing from the spirit of the invention.

What is claimed is:

1. A packing dement for use in exchange apparatus wherein a plurality of such packing elements may be disposed and within which first and second fluids may interact, said packing element comprising material forming a plurality of strips, with each strip attached at both of its ends and generally bowed, one or more projections, with each projection being attached at one of its ends, a laterally-extending end attachment area at each of two opposite ends of the material, and at least one laterally-extending intermediate attachment area, with strips extending between and attached to one intermediate attachment area and the end attachment areas.

2. A packing element as defined in claim 1 wherein at least one projection extends from an attachment area.

3. A packing element as defined in claim 1 further comprising an array of strips and projections, with at least some of the strips and projections arranged alternatingly side by side.

4. A packing element as defined in claim 1 wherein at least some of the edges of the strips are serrated.

5. A packing element as defined in claim 1 wherein at least some of the edges of the projections are serrated.

6. A packing element as defined in claim 1 wherein the strips are generally spread mutually apart to increase the openings therethrough.

7. A packing element as defined in claim 1 wherein the projections are of at least two different lengths.

8. A packing element as defined in claim 1 wherein the material is metal.

9. A packing element as defined in claim 1 wherein the material is plastic.

10. A packing element as defined in claim 1 wherein the packing element has no more than one axis of rotational symmetry.

11. A packing element as defined in claim 1 further comprising a multiplicity of like packing elements, with all said packing elements combined in the apparatus.

12. A packing element as defined in claim 1 further comprising two laterally-extending intermediate attachment areas, with a strip extending between and attached to each of these intermediate attachment areas and each end attachment area.

13. A packing element as defined in claim 1 wherein two strips extend between two of the attachment areas.

14. A packing element as defined in claim 13 wherein two strips extending between the same two attachment areas of the material cooperate to form a closed loop.

15. A packing element as defined in claim 13 wherein two strips extending between the same two attachment areas of the material are bowed toward opposite sides of the material.

16. A packing element for use in exchange apparatus wherein a plurality of such packing elements may be disposed and within which first and second fluids may interact, said packing element comprising a plurality of strips attached at their respective ends, and one or more projections, each projection being attached at one of its ends, with the strips generally bowed so that the packing element is skewed at an acute angle.

* * * * *